Figure 1:
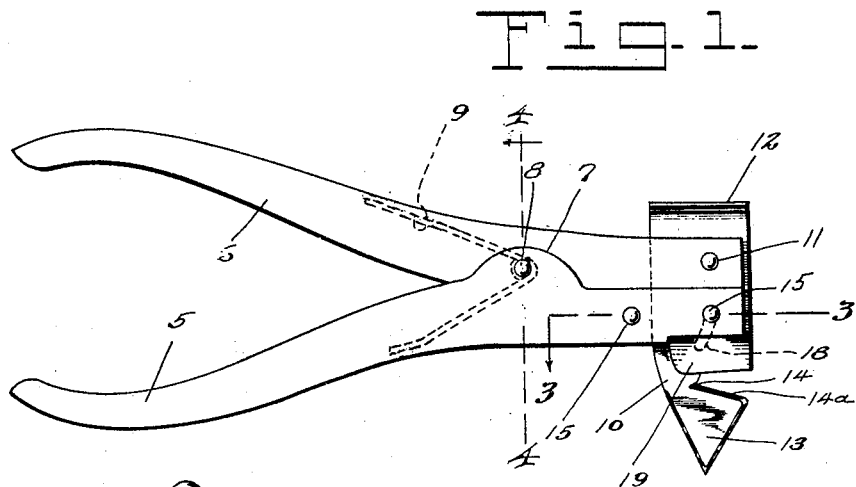

H. COENSGEN.
CAN OPENER.
APPLICATION FILED OCT. 20, 1920.

1,396,254.

Patented Nov. 8, 1921.

Henry Coensgen INVENTOR.

BY

ATTORNEYS.

UNITED STATES PATENT OFFICE.

HENRY COENSGEN, OF GREAT FALLS, MONTANA.

CAN-OPENER.

1,396,254.   Specification of Letters Patent.   Patented Nov. 8, 1921.

Application filed October 20, 1920. Serial No. 418,226.

*To all whom it may concern:*

Be it known that I, HENRY COENSGEN, citizen of the United States, residing at Great Falls, in the county of Cascade and State of Montana, have invented new and useful Improvements in Can-Openers, of which the following is a specification.

This invention relates to implements or tools for cutting the tops of sheet metal cans to produce an opening therein or to effect the removal thereof.

The invention has for its object to provide a very simple and efficient implement of the kind stated, and also one which is easy to operate, and which can be used for making straight or curved cuts in flat sheeting such as tin or other sheet metal.

The object stated is attained by means of a novel combination and arrangement of parts to be hereinafter described and claimed and in order that the same may be better understood, reference is had to the accompanying drawing forming a part of this specification.

Figure 2:
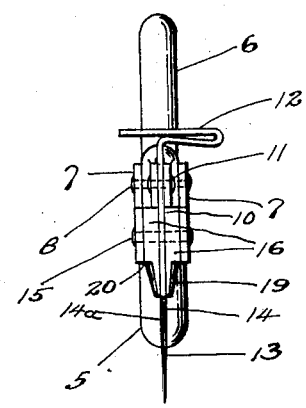
Figure 3:
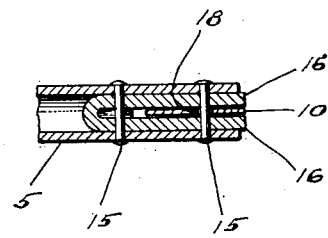
Figure 4:
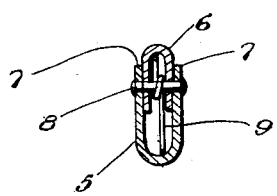

In the drawing,

Figure 1 is a side elevation of the invention; Fig. 2 is an end view thereof, and Figs. 3 and 4 are sections on the lines 3—3 and 4—4, respectively of Fig. 1.

Referring specifically to the drawing, the implement is composed of a pair of pivotally connected handles 5 and 6, one of which carries a cutter element to be presently described. The handles are constructed of sheet metal which is bent into channel shape, and they are pivotally connected intermediate their ends so that when their rear ends, which are shaped to form hand grips, are swung toward each other, the forward ends of the handles are spread. The handle 5 has ears 7 which lap the sides of the handle 6, and the pin or rivet 8 which provides the pivotal connection between the handles passes through said ears and through the handle 6. A spring 9 coiled around the pin 8 and having its ends bearing against the handles on the inner sides thereof, to the rear of said pin, normally holds the handles so that their rear or hand grip portions are spread and their forward ends come together. The spring ends seat in the channels formed on the inside of the handles by the channeled cross-sectional contour thereof, so that the outer surfaces of the hand grips are left smooth.

The cutting element of the implement is a flat blade 10 which is connected to the outer or forward end of the handle 6 by a rivet or pin 11, the connection being a loose one. This blade extends transversely with respect to the two handles and it passes through a slot in the forward end portion of the handle 5 so as to project downwardly therefrom, or laterally, according to the position of the implement. Ordinarily, when used for cutting a can top, the implement is held so that the blade extends downwardly from the handle 5. The blade also projects slightly from the back of the handle 6, and it is here formed with a head 12 for a purpose to be presently described.

That portion of the blade 10 which projects from the handle 5 is the cutting portion, the blade here being V-shaped, as shown at 13 so as to come to a point. The sides of the blade at the V-shaped terminal thereof are sharpened, and hence this portion of the blade can be readily forced through the can top to puncture the same. A relatively short distance back of the pointed end of the blade, the same has a recess 14 extending transversely of the blade and opening through its forward edge. The bottom edge 14ᵃ of this recess is sharpened to produce a cutting edge.

In the forward end portion of the handle 5, there is seated lengthwise in the channel thereof, and secured by rivets 15, a yoke, between the branches 16 of which latter the blade 10 works and is guided. One of the rivets 15 passes through the sides of the handle, and through the yoke branches and across the latter so as to extend through a slot 18 in the blade 10, whereby the latter is guided and held in proper operative position.

The yoke branches 16 have bottom extensions 19 passing through a recess 20 in the bottom of the handle 5. When the parts are in their normal position, the bottom edges of the extensions 19 are flush with the top edge of the recess 14, and the cutting edge 14ᵃ is beneath the same. It will be understood that the blade is operated by manipulating the handles 5 and 6, so as to bring the cutting edge 14ᵃ toward the bottom edges of the extensions 19, and hence the latter operate as a stationary jaw between which and the cutting edge 14ᵃ the material to be cut is positioned.

In operation, the implement is positioned so as to place the blade 10 perpendicular to the can top to be cut, the pointed end of the blade being placed near the edge of the can. The blade is now pushed through the can top to puncture the same, this being readily done by pushing on the head 12 or by striking the same with the hand, or with a hammer or other tool if necessary. The blade will be inserted a distance to bring the parts 19 in contact with the can top, which positions the cutting edge 14ª beneath the can top. The handle 6 is now operated to reciprocate the blade, and at the same time the implement is advanced as the edge makes a cut in the can top. The cut can be run entirely around the can, and cans having sharp corners, such as square cans, can be cut in the same manner by turning the implement sharply at the corners while the part 19 is above the recess 14. If the implement is tilted sidewise toward the can edge, it will operate somewhat easier. The implement can also be used for cutting flat sheet metal stock.

I claim:

1. A cutting implement comprising a pair of pivotally connected handles, a blade carried by one of the handles and passing transversely through the other handle to project therefrom, said projecting blade end being pointed and having a transverse work-receiving recess opening through one of its edges, one of the edges of the recess being sharpened to form a cutting edge, and a stationary jaw member on the second-mentioned handle toward and from which the aforesaid cutting edge is movable.

2. A cutting implement comprising a pair of pivotally connected handles, a blade carried by one of the handles and passing transversely through the other handle to project therefrom, said projecting blade end being pointed and having a transverse work-receiving recess opening through one of its edges, one of the edges of the recess being sharpened to form a cutting edge, and a stationary jaw member on the second-mentioned handle toward and from which the aforesaid cutting edge is movable, said jaw member and the handle carrying the same being divided to form a guide for the blade.

3. A cutting implement comprising a pair of pivotally connected handles, a blade carried by one of the handles and passing transversely through the other handle to project therefrom, said projecting blade end being pointed and having a transverse work-receiving recess opening through one of its edges, one of the edges of the recess being sharpened to form a cutting edge, and a stationary jaw member on the second-mentioned handle toward and from which the aforesaid cutting edge is movable, said jaw member and the handle carrying the same being divided to form a guide for the blade, said blade having a longitudinal slot, and the divided portion of the handle carrying a cross-pin extending through the slot.

4. A cutting implement comprising a pair of pivotally connected handles, a blade carried by one of the handles and having a head to the rear thereof, said blade passing transversely through the other handle to project therefrom, said projecting blade end being pointed and having a transverse work-receiving recess opening through one of its edges, one of the edges of the recess being sharpened to form a cutting edge, and a stationary jaw member on the second-mentioned handle toward and from which the aforesaid cutting edge is movable.

5. A cutting implement comprising a blade having a pointed end and a transverse work-receiving recess opening through one of its edges back of the pointed end, one of the edges of the recess being sharpened to form a cutting edge, a pair of pivotally connected handles one of which carries the blade, and a stationary jaw member on the other handle coöperating with the aforesaid cutting edge.

In testimony whereof I affix my signature.

HENRY COENSGEN.

Witness:
G. W. PFAFF.